US008139587B2

(12) United States Patent
Larsson et al.

(10) Patent No.: US 8,139,587 B2
(45) Date of Patent: Mar. 20, 2012

(54) METHOD AND APPARATUS FOR ROUTING PACKETS

(75) Inventors: Peter Larsson, Solna (SE); Mikael Prytz, Rönninge (SE); Kai-Erik Sunell, Bromma (SE); Johan Lundsjo, Spånga (SE); Niklas Johansson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 11/667,187

(22) PCT Filed: Nov. 11, 2004

(86) PCT No.: PCT/SE2004/001640
§ 371 (c)(1),
(2), (4) Date: Mar. 18, 2008

(87) PCT Pub. No.: WO2006/052171
PCT Pub. Date: May 18, 2006

(65) Prior Publication Data
US 2009/0010269 A1    Jan. 8, 2009

(51) Int. Cl.
*H04L 12/28* (2006.01)
*H04L 12/56* (2006.01)
(52) U.S. Cl. ............... 370/395.5; 370/255; 370/256; 370/356; 370/386; 709/238; 709/239; 709/243
(58) Field of Classification Search .......... 370/255, 370/256, 310, 310.2, 311, 314, 320, 321, 370/329, 332, 352, 353, 355, 356, 360, 386, 370/395.21, 395.5, 395.52; 455/445, 451, 455/452.1, 452.2, 456.2; 709/220, 221, 224, 709/238, 239, 240, 243
See application file for complete search history.

(56) References Cited

U.S. PATENT DOCUMENTS
5,960,344 A * 9/1999 Mahany ............... 455/432.2
(Continued)

FOREIGN PATENT DOCUMENTS
EP    1 408 651    4/2004
(Continued)

OTHER PUBLICATIONS

"Selection diversity forwarding in a multihop packet radio network with fading channel and capture"; Larsson, Peter; ACM SIGMOBILE Mobile Computing and Communications Review; vol. 5, No. 4, ISSN 1559-1662, pp. 47-54; Oct. 2001. [http://doi.acm.org/10.1145/509506.509517].*

(Continued)

*Primary Examiner* — Aung S Moe
*Assistant Examiner* — Benjamin H Elliott, IV
(74) *Attorney, Agent, or Firm* — Nixon & Vanderhye P.C.

(57) ABSTRACT

Packets may be routed in a heterogeneous communications network as follows: for a set of packets comprising at least one packet to be transmitted from a sending node, said sending node being able to handle communication according to at least two access technologies,—selecting in a selection unit in the sending node an access technology for use when transmitting the set of packets,—selecting a receiving node in the network to which to transmit the set of packets among nodes in the network that are able to handle said selected access technology—transmitting the set of packets to the selected receiving node using the selected access technology. Alternatively, a set of packets may be transmitted to one or more nodes using at least two different access technologies. Depending on the transmission quality, one node may be selected to forward the set of packets.

32 Claims, 4 Drawing Sheets

U.S. PATENT DOCUMENTS

| | | | | |
|---|---|---|---|---|
| 6,198,920 | B1* | 3/2001 | Doviak et al. | 455/426.1 |
| 6,205,148 | B1* | 3/2001 | Takahashi et al. | 370/401 |
| 6,219,391 | B1* | 4/2001 | Nakano | 375/346 |
| 6,421,731 | B1* | 7/2002 | Ciotti et al. | 709/238 |
| 6,590,895 | B1* | 7/2003 | Gupta et al. | 370/394 |
| 6,748,246 | B1* | 6/2004 | Khullar | 455/574 |
| 6,850,498 | B2* | 2/2005 | Heath et al. | 370/328 |
| 6,978,138 | B2* | 12/2005 | Japenga et al. | 455/436 |
| 7,068,624 | B1* | 6/2006 | Dantu et al. | 370/331 |
| 7,085,241 | B1* | 8/2006 | O'Neill et al. | 370/254 |
| 7,130,625 | B2* | 10/2006 | Akgun et al. | 455/422.1 |
| 7,139,579 | B2* | 11/2006 | Hatano | 455/453 |
| 7,142,864 | B2* | 11/2006 | Laroia et al. | 455/450 |
| 7,224,697 | B2* | 5/2007 | Banerjea et al. | 370/401 |
| 7,228,133 | B2* | 6/2007 | Rink et al. | 455/433 |
| 7,260,654 | B1* | 8/2007 | Satapathy et al. | 709/250 |
| 7,295,568 | B2* | 11/2007 | Kossi et al. | 370/432 |
| 7,302,230 | B2* | 11/2007 | Coupechoux et al. | 455/62 |
| 7,313,399 | B2* | 12/2007 | Rhee et al. | 455/445 |
| 7,315,750 | B2* | 1/2008 | Chou et al. | 455/552.1 |
| 7,480,307 | B2* | 1/2009 | Chaskar et al. | 370/401 |
| 7,623,477 | B2* | 11/2009 | Corson et al. | 370/278 |
| 2003/0108062 | A1* | 6/2003 | Agrawal et al. | 370/463 |
| 2003/0123419 | A1* | 7/2003 | Rangnekar et al. | 370/338 |
| 2003/0156543 | A1* | 8/2003 | Sahinoglu et al. | 370/238 |
| 2003/0210660 | A1* | 11/2003 | Wiberg et al. | 370/320 |
| 2004/0087268 | A1* | 5/2004 | Hatano | 455/7 |
| 2004/0109433 | A1* | 6/2004 | Khan | 370/345 |
| 2004/0109472 | A1* | 6/2004 | Choyi et al. | 370/466 |
| 2004/0131078 | A1* | 7/2004 | Gupta et al. | 370/466 |
| 2004/0133668 | A1* | 7/2004 | Nicholas, III | 709/223 |
| 2004/0151184 | A1* | 8/2004 | Wang et al. | 370/395.2 |
| 2004/0165600 | A1* | 8/2004 | Lee | 370/395.53 |
| 2004/0185887 | A1* | 9/2004 | Wolman et al. | 455/516 |
| 2004/0213198 | A1* | 10/2004 | Mahmood et al. | 370/349 |
| 2004/0218605 | A1* | 11/2004 | Gustafsson et al. | 370/395.2 |
| 2005/0136898 | A1* | 6/2005 | Shaheen et al. | 455/414.1 |
| 2005/0152305 | A1* | 7/2005 | Ji et al. | 370/328 |
| 2005/0220131 | A1* | 10/2005 | Ginzburg et al. | 370/432 |
| 2005/0243870 | A1* | 11/2005 | Balogh et al. | 370/522 |
| 2006/0008020 | A1* | 1/2006 | Blankenship et al. | 375/261 |
| 2006/0088009 | A1* | 4/2006 | Gibbs et al. | 370/338 |
| 2006/0114826 | A1* | 6/2006 | Brommer | 370/230 |
| 2006/0217072 | A1* | 9/2006 | Poyhonen et al. | 455/67.11 |
| 2006/0256767 | A1* | 11/2006 | Suzuki et al. | 370/351 |
| 2007/0087745 | A1* | 4/2007 | Poyhonen et al. | 455/432.1 |
| 2007/0171868 | A1* | 7/2007 | Furuskar et al. | 370/331 |
| 2008/0201748 | A1* | 8/2008 | Hasek et al. | 725/98 |
| 2008/0298313 | A1* | 12/2008 | Salminen | 370/329 |
| 2009/0010269 | A1* | 1/2009 | Larsson et al. | 370/400 |

FOREIGN PATENT DOCUMENTS

| | | |
|---|---|---|
| EP | 1 435 708 | 7/2004 |
| EP | 1 453 248 | 9/2004 |
| TW | 200415891 A | 8/2004 |
| WO | 02/45375 A2 | 6/2002 |
| WO | 02/51052 | 6/2002 |
| WO | 2004/091155 | 10/2004 |

OTHER PUBLICATIONS

"Dynamic adaptive routing for a heterogeneous wireless network"; Wu, Eric Hsiao-Kuang, Huang, Yi-Zhan; Mobile Networks and Applications, vol. 9, Issue 3, pp. 219-233, Jun. 2004.*

"Selection diversity forwarding in a multihop packet radio network with fading channel and capture"; Larsson, Peter; ACM SIGMOBILE Mobile Computing and Communications Review; vol. 5, No. 4, ISSN 1559-1662, pp. 47-54; Oct. 2001. [http://doi.acm.org/10.1145/509506.509517.*

International Search Report for PCT/SE2004/001640 mailed Jun. 16, 2005.

TW Search Report for Patent Application mailed Apr. 23, 2008 in corresponding TW application 094137373.

Chinese Office Action dated Sep. 25, 2009 w/English translation (15 pages total).

English translation of Second Chinese Office Action dated Sep. 6, 2010 (13 pages).

Chinese Office Action dated Feb. 16, 2011 in corresponding Chinese Patent Application No. 200480044824.3 (17 pages).

European Office Action dated Mar. 21, 2011 in corresponding European Patent Application No. 04800303.2-2416 (5 pages).

European Ofilce Action dated Dec. 9, 2011 (5 pages).

* cited by examiner

METHOD AND APPARATUS FOR ROUTING PACKETS

This application is the US national phase of international application PCT/SE2004/001640 filed 11 Nov. 2004, which designated the U.S., the entire content of which is hereby incorporated by reference.

TECHNICAL FIELD

The present disclosure relates to a method and an apparatus for routing packets between a source and a destination in a communications network having multiple access technologies.

BACKGROUND

In every communications network one of the major problems to be solved is how to route the information in the best possible way between the source and the destination. Routing protocols may generally be classified into two different categories, namely centralised and distributed routing protocols. In centralised routing some central node determines the path to follow from source to destination, whereas in distributed routing all nodes in the network participate in the routing decision and each node is able to calculate a "good" path to follow from itself in the direction of the destination. Most currently used routing protocols are developed for wired networks, in which the shortest path is selected, and then used over some period in time. A typical metric for the shortest path may aim to minimize delay.

Routing in wireless networks has traditionally been based on adaptations of the methods developed for wired networks. This means that in the general case a path is selected and all packets transmitted between a source and a destination follow the same path, unless something major happens that changes the structure of the network. That is, in practice, single path routing is commonly used in wireless networks.

Wireless networks are, for several reasons, generally more dynamic than wired networks. The experienced interference levels at different receivers will vary depending on whether anything is being transmitted on a particular link at a given time and with what power. Moreover, propagation conditions are exposed to time variations depending on the user location and obstacles in the environment, i.e. movement of nodes as well as obstacles affects the channel. Similarly, the channel may vary in the frequency domain due to time dispersive propagation. Short term fading may also arise, due to large number of randomly scattered (and possibly direct) signals superimposed at the receiver antenna.

Since the channel fluctuates, not only does the desired received carrier fluctuate, but also the experienced interference will fluctuate. This is due to channel variations, but also to what appear as random and unpredictable traffic variations. The quality for a link is dependent both on the desired signal as well as the interference, and typically both vary.

Trying to follow the rapid changes in the network when routing packets is often infeasible since it may lead to extensive control signalling. One other option is to calculate the routing decisions on the basis of averages.

Thus, one problem of single path routing in wireless networks is that local and instantaneous propagation and queue conditions that can provide additional guidance in the forwarding decision are often not fully exploited. For example one node in a predetermined path may experience a temporary and high path loss due to fast fading, which is not reflected in the routing choice.

What has been described above is true for most routing methods, but some routing methods are opportunistic in the sense that they make use of variations in the network to select a transmission path that is particularly advantageous at a given moment. For example, multiuser diversity, as described in WO 2004/091155, can be used in opportunistic routing by transmitting at any given time to the user that at this particular time has a better connection than the others. Subsequently, the user forwards any data according to the same transmission principle, and the data heads towards the destination. By always transmitting on the paths that are momentarily good the network is utilized in the best possible way. Since the received signal quality will generally vary over time, all users will in the long run receive data.

In recent years nodes and terminals have emerged that can use two or more different radio access technologies, so called multi access or multi-radio access, each radio access technology being characterized by certain strengths and weaknesses for different conditions. One such combination that is often found is Wireless Local Area Network (WLAN) and Wideband Code Division Multiple Access (WCDMA). Typically different radio access technologies make use of separate frequency bands, meaning that multi access capable nodes and terminals can get access to multiple independent spectrum resources. In existing multi access terminals and nodes the source chooses which radio access technology to use at a given time, the decision being based on one or several factors such as current channel conditions, interference levels in the corresponding frequency bands, and/or more general properties such as typical quality of service level offered, or simply by availability of the respective radio access technologies at the current location.

A network in which only one single access technology is used is referred to as a homogeneous network, whereas a network allowing multiple access technologies is often referred to as a heterogeneous network. Traditionally, routing in homogenous networks has been the object of many studies, while the interest in wireless routing for heterogeneous networks has been significantly smaller. In particular, routing in heterogeneous networks has not addressed radio aspects yet. Moreover, existing routing schemes for heterogeneous networks are not responsive to the rate of changes experienced in a radio environment.

OBJECT OF THE INVENTION

Thus, it is an object of one or more non-limiting aspects of the invention to enable routing in heterogeneous wireless networks that better utilizes the possibilities offered by such a network.

SUMMARY

The aspect(s) of the present invention achieves this object through an example a method for routing packets between a source and a destination in a heterogeneous communications network comprising the steps of for a set of packets, comprising at least one packet, to be transmitted from a sending node, said sending node being able to handle communication according to at least two access technologies:

selecting in a selection unit in the sending node an access technology for use when transmitting the set of packets;

selecting a receiving node in the network to which to transmit the packets among nodes in the network that are able to handle said selected access technology; and transmitting the set of packets to the selected receiving node using the selected access technology.

The object is also achieved by a non-limiting sending node embodiment for use in a heterogeneous communications network in which packets are routed between a source and a destination, said sending node being able to forward packets to at least two receiving nodes in the network and said node comprising protocol means for handling communication according to at least two access technologies, said node comprising:

protocol selection means for selecting an access technology for use when transmitting a set of packets comprising at least one packet, node selecting means for selecting a receiving node in the network to which to transmit the packets among nodes in the network that are able to handle said selected access technology transmission means for transmitting the set of packets to the selected receiving node using the selected access technology.

The solution according to one or more aspects of the invention provides greater bandwidth, better channel resource utilization and a greater overall transmission rate in the network, by allowing the selection at any time of both next hop node and access technology to be used. It also provides diversity in that the technology that has a good channel, and/or little load at any given time, can be selected for transmission.

Some nodes in the network may provide for several different access technologies, others only one.

Preferably, the protocol selection means is arranged to select the access technology in dependence of the channel quality for the access technology. This is preferably accomplished such that the coherence time of the channel is long enough that the channel quality can be considered to be constant until the time when the quality is used for scheduling. This could be defined as that the channel dependent scheduling to be operating on "instantaneous" channel quality.

The node selecting means is preferably arranged to select the receiving node in dependence of the channel quality of the connection to said receiving node, and or in dependence of the cost from the sending node to the destination and the cost from the receiving node to the destination.

The node and access technologies can also be selected in dependence of the type of service, or the type of data that is to be transmitted.

In a preferred embodiment, the sending node further comprises probe means for transmitting a probe to at least one receiving node using at least one access technology, and evaluation means for evaluating the channel quality on the basis of the response from the receiving node. Alternatively, the channel quality for a particular link may be determined by statistical data collected during communication and stored in a database in the sending node. The channel quality can be determined in different ways for different links from the same sending node.

The sending node preferably comprises packet-selecting means for selecting a set of packets to send from packets stored in the buffers. This is particularly useful if the sending node comprises more than one packet flow (henceforth the words packet flow and buffer will be used interchangeably), but may also be used to select a set of packets within one packet flow. The packet selecting means may be arranged to select the set of packets in dependence on the instantaneous quality of the link on which said set of packets is to be sent.

The sending node may further comprise rate mode selection means for selecting the transmission rate for the set of packets. This enables adaptation to instantaneous network capacity as well as to the preferences of a particular user.

The sending node may also comprise property selection means for selecting at least one other link property, such as transmit power, for the transmission.

The idea of multi-user diversity is applied in a multi-access context, resulting in that the perceived instantaneous optimum access technology is chosen at each instance. Hence, one can avoid blocked or overloaded access technologies smoothly in an opportunistic manner. One can more specifically utilize fluctuations due to unpredictable interference and fading to select the best access technology at each instance. A simple example of the benefit of opportunistic selection of access technology is now given. Assume that the probability of an access technology's availability is P, and N access technologies exist, then the probability that any access technology is available, increases to $P(\text{At least one RAT available})=1-(1-P(\text{RAT available}))^N$.

To illustrate the benefit when multiple access technologies are available, assume that one has two access technologies and the probability for success at each access technologies is 0.9, then the total success probability adds up to 0.99.

Moreover, aspect(s) of the invention proposes an efficient and appealing solution to multi-access technology routing. In particular the increased degrees of opportunistic freedoms offered by the availability of more than one access technology increases the performance, e.g. with respect to throughput, latency and energy/power consumption, over prior art routing schemes.

A hierarchy of opportunistic selection levels offer low complexity.

In addition, in scheduling packets with differentiated QoS requirements (such as delay, throughput, residual packet error rate etc.) to be sent, it is possible to exploit the different characteristics of the different radio access technologies. This may also include taking the usage cost (in e.g. dollars or other currency) of different access technologies into account.

BRIEF DESCRIPTION OF THE DRAWINGS

The present invention will be described in more detail in the following, with reference to the appended drawings, in which.

DETAILED DESCRIPTION OF EMBODIMENTS

Figure 1:
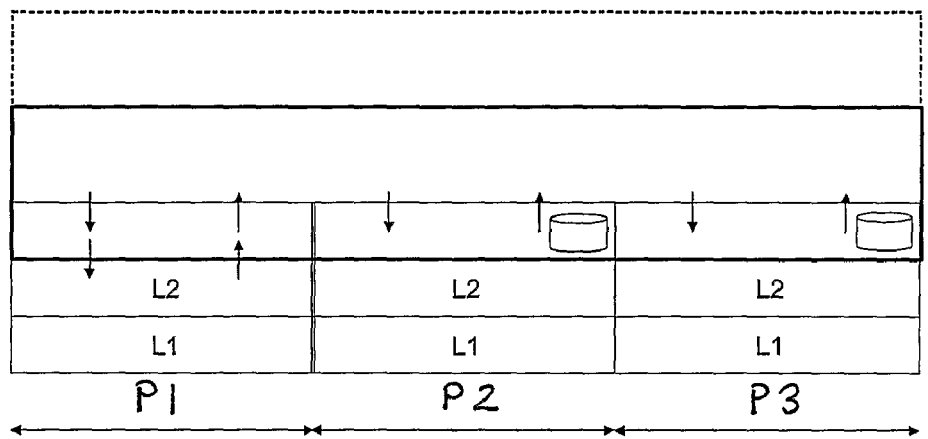
FIG. 1 illustrates schematically an embodiment of a node according to a non-limiting embodiment of the invention.

FIG. 1 illustrates an embodiment of a non-limiting node according to the invention. The node is able to handle three different access technologies P1, P2 and P3 Note that each access technology may also be composed of a set of protocols. Each access technology is schematically illustrated in FIG. 1 by a protocol stack comprising two layers, L1 and L2. Above the protocol stacks a forwarding layer comprising an algorithm according to an embodiment is placed, and above the forwarding layer, possibly other protocol layers are placed, which are not important from the point of view of the invention and will not be discussed here. Between the protocol stacks P1, P2, P3 and the forwarding layer a convergence layer is preferably found. The convergence layer comprises one part for each of the access technologies and is used to provide data to the forwarding layer regarding the available access technologies. The convergence layer may also be seen as an internal and entirely integrated part of the forwarding layer, ensuring smooth Service Access Point (SAP) interfacing to the different access technologies.

According to an embodiment, the forwarding layer receives a signal, or decides itself, that it should try to transmit one or more information packets residing in the node. The forwarding layer sends out an interrogation message to the convergence layer for each of the access technologies. The interrogation message inquires each (or a subset of the available) access technology to test the communication quality to all, or some, relay nodes in the vicinity of the node.

Based on the responses received from all interrogated multi-access technologies, the forwarding layer uses this information, as well as routing cost information, to determine which access technology to use and which relay node to send to. In addition, one or more other parameters may be selected, such as the flow from which a packet should be transmitted, and physical layer transmit parameters, such as rate mode, power, and antenna parameters. Note that when a relay station is close to the destination node, then the selected relay station may also coincide with the destination node. The selected packet is subsequently sent to the selected relay station, using the selected access technology with parameters as selected.

The parameters requested by the forwarding layer may be obtained in different ways for different access technologies. If a homogenous opportunistic forwarding method, such as Multiuser Diversity Forwarding (MDF) is used as one of the access technologies, a physical probing signal is issued to determine the instantaneous communication quality to the respective relay stations. For another access technology it may not be feasible to use a physical probing signal. Instead, information on channel quality may be stored in a database during communication and used to provide statistical data when the forwarding layer requests such information. In the example shown in FIG. 1, such databases are used for the second and third access technologies, P2 and P3.

As shown in FIG. 1, a convergence layer facilitates the interface between the access technologies and the forwarding layer. The database is preferably found in or in connection to the convergence layer. Each convergence layer enables interrogation and responses to and from the access technology layer below, or simply contains a database holding data for the access technology it interfaces to. This database contains information about communication quality to various nodes, that is, information similar to that which can be obtained by physical probing in a homogenous opportunistic forwarding method.

Figure 2:
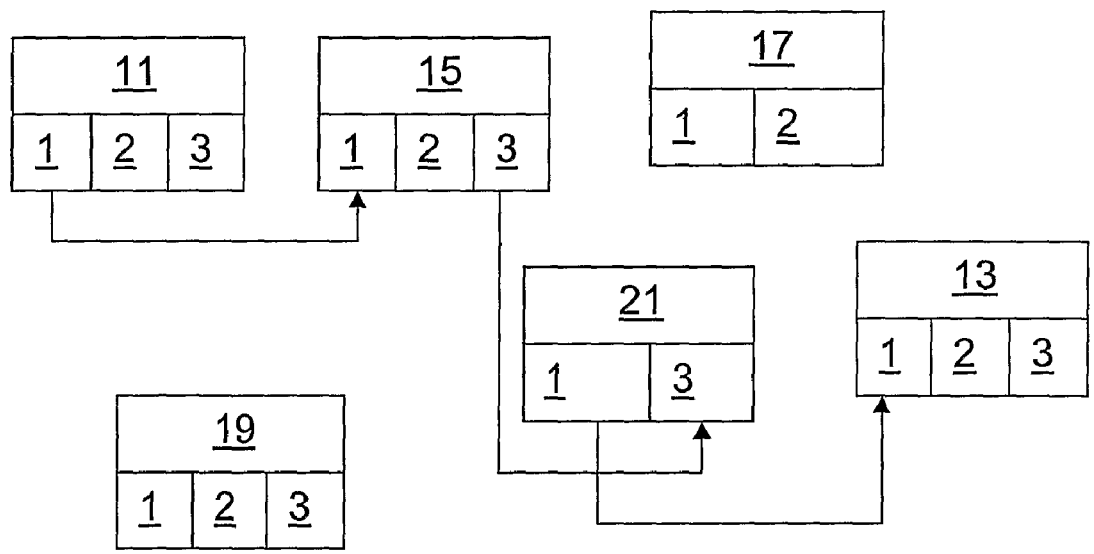
FIG. 2 shows an example of how a packet can be routed in a heterogeneous network according to a non-limiting embodiment of the invention.

FIG. 2 shows an example of how a packet can be routed in a heterogeneous network according to the invention. A source 11, a receiver 13, and four nodes 15, 17, 19, 21 are shown. The source 11, the receiver 13, and each of the nodes 15 and 19 comprise three different access protocol stacks P1, P2, P3 and are able to communicate using all these three technologies. Node 17 comprises two different protocol stacks P1 and P2, and node 21 comprises protocol stacks P1 and P3.

To optimize the routing through the network, according to an embodiment of the invention, each node determines both the best access technology to use for the next hop, and which node to send to. From the source 11, access technology P1 is selected to transmit to the first node 15. The first node 15 determines that the third access technology should be used for the next hop, which should lead to the node 21. From this node 21, access technology P1 is used again, to transmit to the receiver. As can be seen, for each hop, the node to transmit to is selected in dependence of the selected access technology.

When a node is to transmit a packet through the network, the following exemplary process can be used:

The forwarding layer of the node requests quality information from all access technologies that are available in the node. Quality information is returned to the forwarding layer. As discussed above, such quality information is either the result of probing or (statistical) data found in a database.

Each node also has information about the cost, $C_{own}$, involved in transmitting from the node to the destination, as well as the neighbour's costs in transmitting from the neighbour to the destination. The skilled person is familiar with ways of determining the cost from a source to a destination. For example, a standard shortest path protocol, such as the Bellman-Ford algorithm may be adopted to generate the costs for each destination of interest.

An algorithm for the forwarding of packets can be represented by an objective function $f$ with a predetermined metric being optimized over the multiple available access technologies (here we consider the optimization towards one destination, but in practise multiple destinations generally exists). This optimization is performed in the forwarding layer and optimizes the selection of transmission path and technology, preferably taking into account the instantaneous channel quality and the cost of transmission, according to $$\underset{\substack{\forall r \in R \\ \forall a \in A}}{\text{opt}} \{f(Q_{ra}, C_{own}, C_r)\} \qquad (1)$$

where $C_r$ is the cost for the next node for transmitting to the destination

R is the set of all relay stations, or nodes and

A is the set of all available access technologies

Q is a measure of the quality based on, for example, the rate, the bit error rate and the delay. Note that the quality typically differs for different access technologies between own and considered relay node.

Typically, the equation will be $$\underset{\substack{\forall r \in R \\ \forall a \in A}}{\text{opt}} \{f(Q_{ra}, C_{own}, -C_r)\} \qquad (2)$$

where $C_{own}-C_r$ (the cost progress) indicates the length of the step taken in the direction of the destination. If $C_{own}-C_r$ is negative, this means that the packet will be travelling away from the destination, which is undesirable. A long step will be desirable, but for many metrics this will also generally lead to low quality in the link. Therefore, the length of the step should be balanced against the quality loss.

The result of the optimization is given by $$\{\tilde{r}, \tilde{a}\} = \arg\underset{\substack{\forall r \in R \\ \forall a \in A}}{\mathrm{opt}} \{f(Q_{ra}, C_{own}, C_r)\}, \quad (3)$$

which means that the result of the optimization will be the selection of a relay station $\tilde{r}$ to send to and an access technology $\tilde{a}$ to be used. Note that the access technology and the relay station are jointly selected in the optimization procedure above.

In addition to the above, the flow from which to select a packet, and the rate may also be adaptively (and jointly) selected to optimize the performance even more. The rate is adapted e.g. through selecting suitable modulation and coding.

Figure 3:
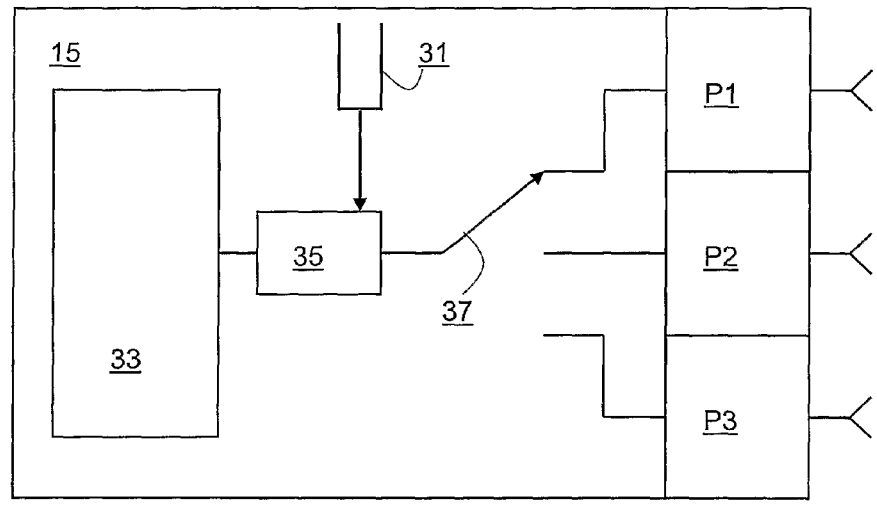
FIG. 3 is a simplified view of a node according to a non-limiting embodiment of the invention.

FIG. 3 is a simplified view of a node 15 according to an embodiment of the invention comprising functions for selecting a node to send to and an access technology. The node 15 shown in FIG. 3 is able to use three different access technologies, P1, P2, P3. The packets to be transmitted are found in one or more buffers 31, where each of the buffers holds one packet flow. For simplicity only one buffer is shown. A selection unit 33 requests information regarding the communication quality to each of the neighbouring nodes using each of the access technologies P1, P2, P3. The quality data is obtained as discussed above and returned to the selection unit 33 that operates according to one of the formulas above to select the optimal access technology and relay station to send to. The connections for the quality data are not shown in FIG. 3. An addressing unit 35 receives the packet to be sent from the buffer 31 and selection information from the selection unit 33. A switch 37 directs the packet through one of the access technology stacks P1, P2, P3 according to the selection information. In FIG. 3, the packet will be sent using access technology P1.

While the access technology, relay node address, rate and flow are selected jointly in the optimization procedure, the actual transmission of a packet may follow a given sequence. For instance, first the packet is taken out from the queue, then the rate is selected, the node address is determined and finally, the packet is forwarded to the selected access protocol stack.

Figure 4:
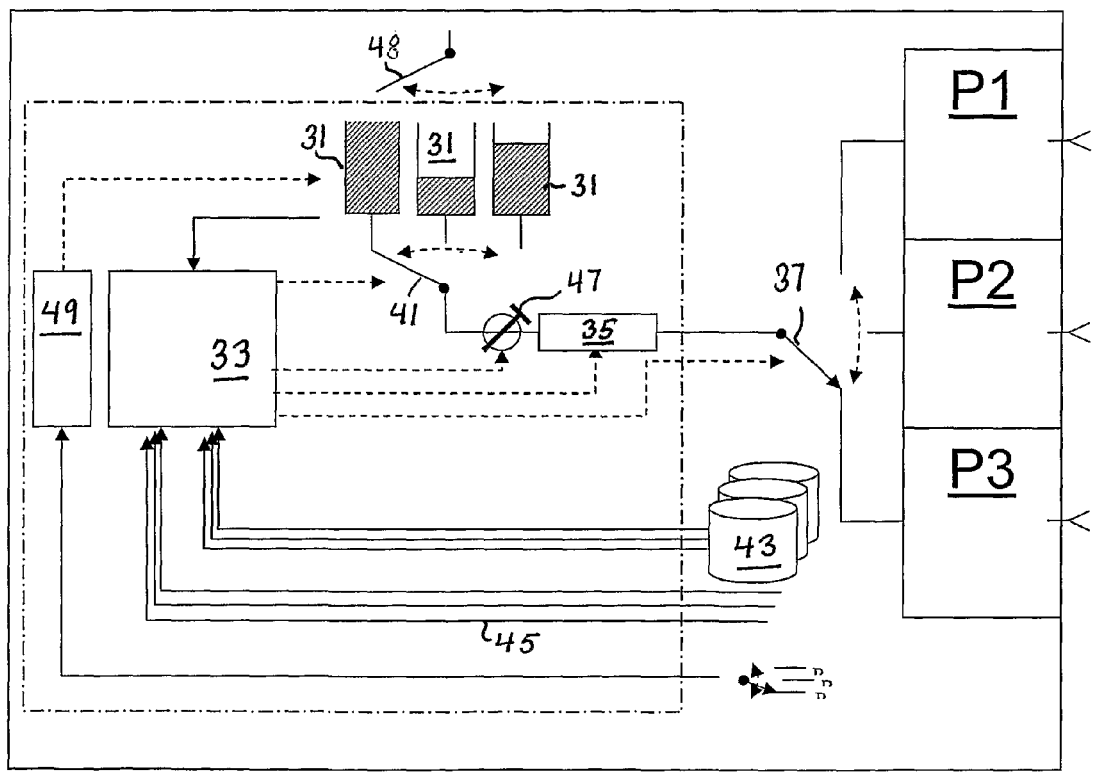
FIG. 4 is a more detailed view of a node according to a non-limiting embodiment of the invention.

FIG. 4 is a more detailed view of a node according to the invention. As in FIG. 3, the node can handle three different access technologies, P1, P2, P3. Three different flows of data packets are handled, represented by three buffers 31. A buffer switch 41 selects the buffer from which a packet should be sent at any given time.

A selection unit 33 receives cost information for each possible link from a number of databases 43, each corresponding to one of the access technologies. The selection unit 33 also receives channel quality information on connections 45, usually in response to requests transmitted from the selection unit.

As in FIG. 4, an addressing unit 35 is used to address the packet to be sent and a switch 37, arranged to receive the packet from the addressing unit 35 is used to direct the packet to the selected access technology P1, P2, P3. Between the selection unit and the addressing unit a rate selector 47 is arranged.

The selection unit 33 also receives information from the buffers 31 regarding the presence of packets in the buffers 31, and their queuing time. Based on this information, the selection unit 33 selects the access technology P1, P2, or P3, the node to send to, the rate and finally the packet to be sent. Control signals regarding these selections are sent to the switch 37 for selecting the access technology, to the addressing unit 35, the rate selector 47 and the buffer switch 41, respectively, in order to control the transmission of the packet according to what has been determined by the selection unit. The control signals from the selection unit 33 are indicated in FIG. 4 by dashed lines.

A switch 48 on the input to the node is used to direct incoming packets into the appropriate buffer 31. An Automatic Repeat Request (ARQ) unit 49 is usually arranged to monitor whether transmitted packets are received as intended. The ARQ unit 49 receives acknowledgments from the nodes to which packets are sent and when a packet has been acknowledged, it can be deleted from the transmission buffer 31.

Figure 5:
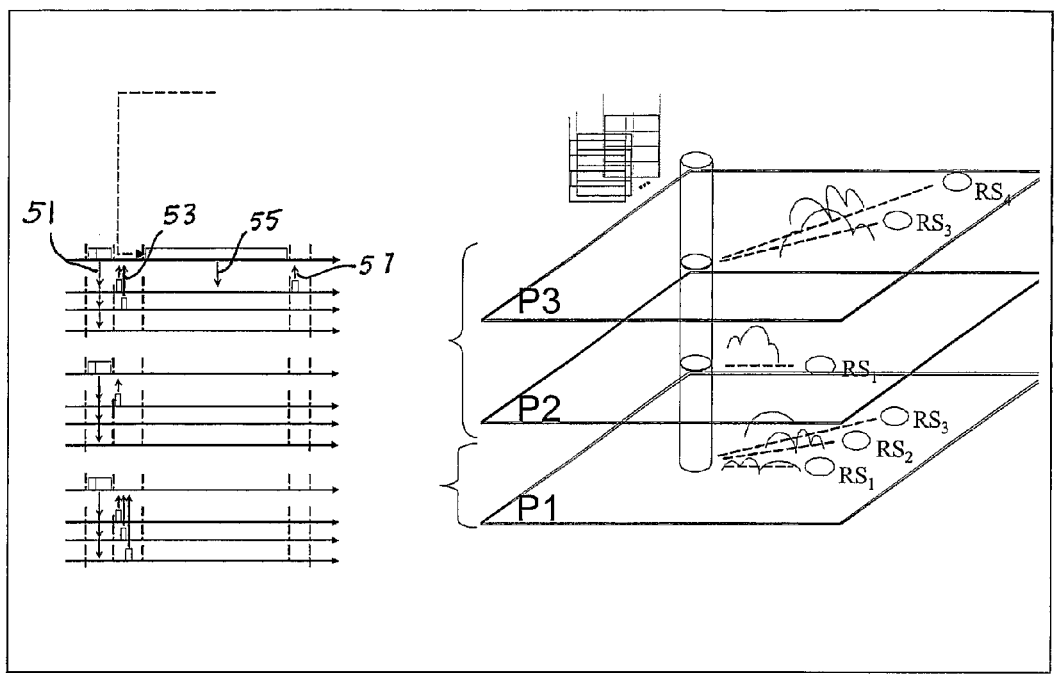
FIG. 5 illustrates the transmission according to a non-limiting embodiment of the invention.

An illustration of the transmission according to an embodiment of the invention is provided in FIG. 5. In the example illustrated in FIG. 5 as well as the previous examples, three different access technologies P1, P2, P3 are assumed to be present in the same node. Each access technology is represented by a plane. To the left in FIG. 5, the interrogation is illustrated using arrows. As discussed above, for each available access protocol channel quality information for different nodes is requested. This request is represented by downward pointing arrows 51 in FIG. 5. The interrogation responses are represented by upward pointing arrows 53 to the unit transmitting the request. Thereafter, one destination of data is selected and data is transmitted to this recipient, which is referred to as the destination. The transmission of data is represented by a downward pointing arrow 55. Preferably, the receipt of data is acknowledged in an ACK signal represented by an upward pointing arrow 57. Note that for some access technologies, the interrogation message (which is sent from the forwarding layer to the underlying access technologies), may have two different result depending on the considered access technology. Either the databases in the access technology is interrogated, or if the access technology allows, a probe signal is sent out to test the availability of one or more nodes and the associated communication quality. The probed nodes answer with a probe response.

As discussed above, the resulting interrogation responses may be responses to probing signals, or consist of statistical data from a database.

Figure 6A:
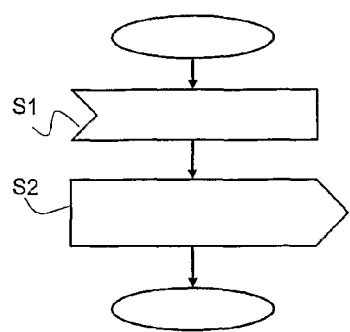
FIGS. 6a and 6b are flow charts of the operation of the selection function performed in a node according to a non-limiting embodiment of the invention.
Figure 6B:
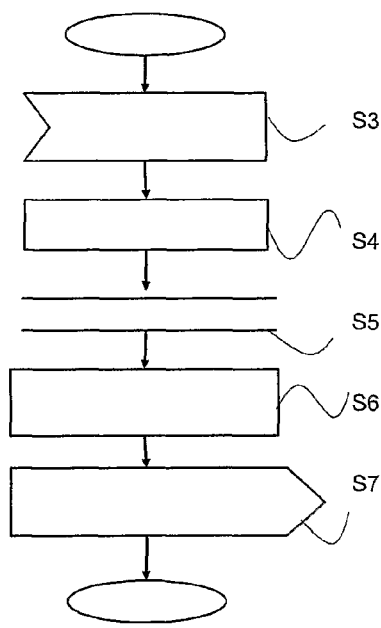

FIGS. 6a and 6b illustrate functions performed in the transmitters forwarding layer to select an access technology to use for a subsequent transmission. The communication is initiated from the selection unit 33 in FIG. 3 or corresponding unit in FIG. 4. The elliptic shapes at the beginning and the end of each flow in FIGS. 6a, 6b, 7a, and 7b indicate that the selection unit is in the idle state. At first, as shown in FIG. 6a the selection unit is in the idle state. In step S1 a transmission trigger is received and in step S2 interrogation messages are sent out to determine the quality of connections on different access technologies that can be used by the node. The selection unit then returns to the idle state. The transmission trigger may occur in several different ways. For instance, a trigger may occur simply by that a packet is received in a queue, or alternatively that a medium access scheduler decides to send a packet residing in a queue.

FIG. 6b illustrates the actions taken in the transmitters forwarding layer when the replies to the interrogation messages are received. At first, the selection unit is in the idle state. In step S3 the interrogation message replies are received. In step S4 the replies are stored in the respective database as discussed in connection with FIG. 4. Step S5 is a waiting loop until replies have been received from all access technologies. While waiting, the selection unit is in the idle state. When all replies have been received, in step S6 the access technology to be used is selected and in step S7 the forwarding request is sent to the access technology that was selected in step S6. The selection unit then returns to the idle state.

Figure 7A:
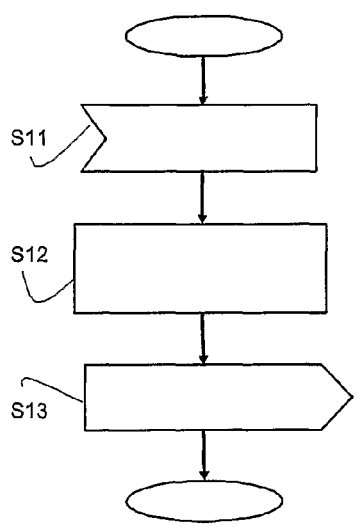
FIGS. 7a and 7b are flow charts of the operation of each access technology in a node according to a non-limiting embodiment of the invention.

FIG. 7a illustrates the operation of each access technology part of the node. First the access technology part is in the idle mode. In step S11 the interrogation message sent out in step S2 is received from the selection unit. In step S12 quality estimation is performed. This is discussed above and may comprise physical probing of each connection, if possible. Alternatively, it may comprise fetching data relating to the quality of each connection from a database. When the quality estimation has been performed, in step S13 an interrogation message reply is transmitted from the access technology part to the selection unit. This is the reply that was received in step S3. The access technology part then returns to idle mode.

Figure 7B:
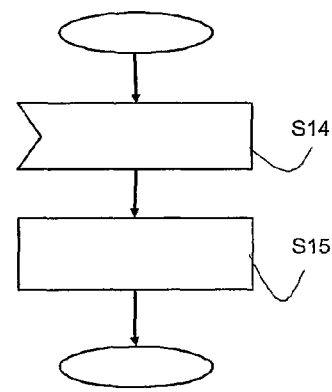

In FIG. 7b the access technology part that was selected for forwarding the data is first in the idle mode. In step S14 it receives a forwarding request from the selection part. This is the forwarding request sent out in step S7 above. In step S15 the data is sent according to the forwarding request to the selected relay node using parameters that have been selected.

In an alternative embodiment, instead of using the interrogation messages as described in the above, a packet, corresponding to a single flow, can be transmitted (unicasted or multicasted) concurrently over multiple access technologies. Based on the result for each receiving node it can be decided which receiving node should take on the responsibility to further forward the packet towards the destination. For example, the sending node can send a forwarding order to the node that is to forward the packet. Any receiving node that has not received a forwarding order within a certain period of time after receiving the set of packets will then discard the set of packets. This will be less cost-efficient than the embodiments described above, but yields communication robustness, as diversity is inherently offered over the multiple access technologies. More specifically, both flow and rate are predetermined when a data packet is transmitted. Based on this, according to an embodiment of the invention, the access technology and relay node are selected in an opportunistic manner. This can be referred to as selection diversity forwarding, where a node performs a forwarding decision based on multiple responses returned subsequent to the multicasting of data to a number of candidate relays.

The invention claimed is:

1. A method for routing packets between a source and a destination in a heterogeneous communications network for a set of packets including at least one packet to be transmitted from a sending node, said sending node being able to handle communication according to at least two wireless access technologies, the method comprising:
   for each packet in the set of packets, the sending node selecting a first wireless access technology among said at least two wireless access technologies for use when transmitting the packet, wherein said first wireless access technology selected for each packet is independent of said first wireless access technology selected for any other packet in the set of packets;
   for each packet in the set of packets, the sending node selecting a first receiving node in the network to which to transmit the packet among nodes in the network that are able to handle said first wireless access technology selected for the packet;
   for each packet in the set of packets, the sending node transmitting the packet to the selected first receiving node using the first wireless access technology; and
   when the first receiving node is a relay node, the relay node selecting a second wireless access technology independent of the first wireless access technology, selecting a second receiving node that is able to handle the second wireless access technology, and transmitting the received packet to the second receiving node using the second wireless access technology,
   wherein for each packet, said first receiving node is selected based on said selected first wireless access technology.

2. The method according to claim 1, further comprising the sending node selecting the first wireless access technology in dependence of a channel quality for the first wireless access technology.

3. The method according to claim 2, wherein the channel quality for the first wireless access technology is an instantaneous channel quality, wherein instantaneous channel quality is such that a coherence time of the channel is long enough that the channel quality can be considered to be constant until the time when the quality is used for scheduling.

4. The method according to claim 2, wherein the channel quality is determined by transmitting a probe signal to at least one receiving node using at least one wireless access technology, and evaluating the quality on the basis of a response from the receiving node.

5. The method according to claim 2, wherein the channel quality for a particular link is determined by statistical data collected during communication and stored in a database in the sending node.

6. The method according to claim 1, further comprising the sending node selecting the first receiving node in dependence of a channel quality of a connection to said first receiving node.

7. The method according to claim 1, further comprising the sending node selecting the first receiving node in dependence of a cost from the sending node to the destination and a cost from the first receiving node to the destination.

8. The method according to claim 1, further comprising selecting the set of packets to send from packets stored in at least one buffer in the sending node.

9. The method according to claim 8, wherein the set of packets is selected in dependence on an instantaneous quality of a link on which said set of packets is to be sent, wherein instantaneous link quality is such that a coherence time of the link is long enough that the lin quality can be considered to be constant until the time when the quality is used for scheduling.

10. The method according to claim 1, further comprising the sending node selecting a transmission rate for the set of packets.

11. The method according to claim 1, further comprising the sending node selecting at least one link property for the transmission, wherein said link properties include one or more of modulation, encoding, and antenna parameters.

12. The method according to claim 1, wherein each wireless access technology is defined by a protocol stack comprising layers L1 and L2.

13. A method for routing packets between a source and a destination in a heterogeneous communications network for a set of packets including at least one packet to be transmitted from a sending node, said sending node being able to handle communication according to at least two wireless access technologies, the method comprising:
   for each packet in the set of packets, concurrently transmitting the packet from said sending node to at least two receiving nodes using said at least two wireless access technologies;

for each packet, the sending node receiving acknowledgements for a successful reception of the packet that applies to the transmission to the at least two receiving nodes from the at least two receiving nodes; and for each packet, the sending node selecting one of the at least two receiving nodes that is to forward the packet to a next receiving node, based on the acknowledgement information indicative of the successful reception.

14. The method according to claim 13, wherein each wireless access technology is defined by a protocol stack comprising layers L1 and L2.

15. A sending node for use in a heterogeneous communications network in which packets are routed between a source and a destination, said sending node being arranged to receive packets according to at least a first wireless access technology and forward the packets to at least two receiving nodes in the network and said sending node arranged to handle communication according to at least the first wireless access technology, said sending node comprising:

a communication unit for receiving a set of packets including at least one packet using the first wireless access technology;

a selection unit for selecting for each packet in the set of packets a second wireless access technology for use when transmitting the packet, said second wireless access technology being selected independent of said first wireless access technology;

the selection unit also for selecting for each packet a receiving node in the network to which to transmit the packet among nodes in the network that are able to handle said second wireless access technology selected for the packet; and the communication unit also for transmitting each packet of the set of packets to the receiving node selected for the packet using the second wireless access technology selected for the packet, wherein for each packet, said selection unit selects said receiving node based on said selected second wireless access technology.

16. The sending node according to claim 15, wherein the selecting unit is arranged to select the first wireless access technology in dependence of the channel quality for the first wireless access technology.

17. The sending node according to claim 15, wherein the selecting unit is arranged to select the receiving node in dependence of a channel quality of a connection to said receiving node.

18. The sending node according to claim 15, wherein the selecting unit is arranged to select the receiving node in dependence of a cost from the sending node to the destination and a cost from the receiving node to the destination.

19. The sending node according to claim 15, wherein the communication unit is arranged to transmit a probe signal to at least one receiving node using at least one wireless access technology; and the selection unit is arranged to evaluate the channel quality on the basis of a response from the receiving node.

20. The sending node according to claim 15, wherein a channel quality for a particular link is determined by statistical data collected during communication and stored in a database in the sending node.

21. The sending node according to claim 15, the selection unit is arranged to select a set of packets to send from packets stored in at least one buffer in the sending node.

22. The sending node according to claim 21, wherein the selection unit is arranged to select the set of packets in dependence on an instantaneous quality of a link on which said set of packets is to be sent, wherein instantaneous link quality is such that a coherence time of the link is long enough that the link quality can be considered to be constant until the time when the quality is used for scheduling.

23. The sending node according to claim 15, further comprising a rate selector for selecting a transmission rate for the set of packets.

24. The sending node according to claim 15, wherein the selection unit is arranged to select at least one link property for the transmission, wherein said link properties include one or more of modulation, encoding, and antenna parameters.

25. The sending node according to claim 15, wherein each wireless access technology is defined by a protocol stack comprising layers L1 and L2.

26. A sending node for use in a heterogeneous communications network in which packets are routed between a source and a destination, said sending node being arranged to forward a set of packets including at least one packet to at least two receiving nodes in the network and said node being arranged to handle communication according to at least two wireless access technologies, said node comprising;

a communication unit for performing, for each packet in the set of packets, concurrently transmitting the packet to at least two receiving nodes using said at least two wireless access technologies;

the communication unit also for receiving for each packet an acknowledgement information from each of the at least two receiving nodes regarding the transmission of the packet; and a selection unit for selecting for each packet one of the at least two receiving nodes from which the packet is to be forwarded to a next receiving node, based on the acknowledgement information.

27. The sending node according to claim 26, wherein each wireless access technology is defined by a protocol stack comprising layers L1 and L2.

28. A node in a heterogeneous communications network in which packets are routed between a source and a destination, the node comprising:

a communication unit arranged to receive from a sending node a packet using a first wireless access technology, and arranged to transmit to a receiving node the packet using a second wireless access technology; and a selection unit arranged to select the second wireless access technology among plural wireless access technologies, and arranged to select the receiving node among plural other nodes in the network, wherein the communication unit is capable of communication with other nodes in the network using each of the plural wireless access technologies, wherein the plural wireless access technologies include the first and second wireless access technologies, and wherein for each packet received by the communication unit, the selection unit is arranged to select the second wireless access technology for the packet independent of the second wireless access technology selected for any other packet, wherein for each packet received by the communication unit, the selection unit is arranged to select the receiving node based on the selected second wireless access technology.

29. The node according to claim 28, wherein the first and second wireless access technologies are different.

30. The node according to claim 28, wherein the selection unit is arranged to select a particular combination of the second wireless access technology and the receiving node based on any one or more of a quality of a communication link of the particular combination, a cost of transmission from the receiving node to the destination, and a cost of transmission from the node to the destination.

31. The node according to claim 28, wherein the communication unit is arranged to transmit the packet substantially concurrently to plural other nodes of the network using at least two of the plural wireless access technologies, and arranged to receive responses from the plural other nodes, the selection unit is arranged to select the second wireless access technology and the receiving node based on the responses received from the plural other nodes, and the communication unit is arranged to transmit a forwarding order message to the receiving node so as to cause the receiving node to forward the packet.

32. The node according to claim 28, wherein each wireless access technology is defined by a protocol stack comprising layers L1 and L2.

* * * * *